(12) United States Patent
Hara et al.

(10) Patent No.: US 7,362,904 B2
(45) Date of Patent: Apr. 22, 2008

(54) IMAGE PROCESSING DEVICE, IMAGE FORMING APPARATUS, PROGRAM, AND STORING MEDIUM

(75) Inventors: Junichi Hara, Kanagawa (JP); Taku Kodama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 859 days.

(21) Appl. No.: 10/662,520

(22) Filed: Sep. 16, 2003

(65) Prior Publication Data
US 2004/0131262 A1 Jul. 8, 2004

(30) Foreign Application Priority Data
Sep. 18, 2002 (JP) ............................. 2002-271186

(51) Int. Cl.
*G06K 9/36* (2006.01)
*G06K 9/46* (2006.01)
(52) U.S. Cl. .................................... 382/232
(58) Field of Classification Search ................ 382/232, 382/240, 244, 247, 248, 298, 299
See application file for complete search history.

(56) References Cited

U.S. PATENT DOCUMENTS

| | | | |
|---|---|---|---|
| 5,923,787 A | | 7/1999 | Hara et al. |
| 7,006,099 B2 * | | 2/2006 | Gut et al. .................... 345/557 |
| 7,110,608 B2 * | | 9/2006 | Chan et al. .................. 382/239 |
| 7,206,804 B1 * | | 4/2007 | Deshpande et al. ......... 709/203 |
| 2001/0028404 A1 | | 10/2001 | Fukuhara et al. |

FOREIGN PATENT DOCUMENTS

| | | |
|---|---|---|
| EP | 0 971 544 | 1/2000 |
| EP | 1 017 238 | 7/2000 |
| JP | 8-70455 | 3/1996 |
| JP | 2001-189844 | 7/2001 |
| JP | 2001-197500 | 7/2001 |
| JP | 2001-258031 | 9/2001 |
| WO | WO 99/49412 | 9/1999 |

OTHER PUBLICATIONS

M. Boliek, et al., ISO/IEC JTC 1/SC 29/WG 1 N1646, XP-001004858, pp. A, B, I-XII, 1-190, "JPEG 2000 Part I Final Committee Draft Version 1.0", Mar. 16, 2000.

(Continued)

*Primary Examiner*—Phuoc Tran
(74) *Attorney, Agent, or Firm*—Oblon, Spivak, McClelland, Maier & Neustadt, P.C.

(57) ABSTRACT

Image data of an original image is compressed and encoded by a JPEG2000 algorithm. A position information adding unit adds, to each tile of the code stream, position information indicating a new position in a changed image to form a new code stream. In this manner, the original image becomes the changed image of the new code stream with all of or a part of contents of the original image being maintained. The changed image is an image of which size is changed from that of the original image, or an image in which a region of the original image is moved.

15 Claims, 14 Drawing Sheets

OTHER PUBLICATIONS

D. Taubman, ISO/IEC JTC1/SC29/WG1 N1143, XP-002146099, pp. 1-90, "JPEG2000 Verification Model VM3A", Feb. 1, 1999.

D. S. Taubman, et al., Proceedings of the IEEE, vol. 90, No. 8, XP-002257522, pp. 1336-1357, "JPEG2000: Standard for Interactive Imaging", Aug. 2002.

M. J. Gormish, et al., International Conference on Image Processing (ICIP 2000), vol. 2, XP-010529915, pp. 29-32, "JPEG2000: Overview, Architecture, and Applications", Sep. 10, 2000.

J. Askelöf, et al., Signal Processing: Image Communication, vol. 17, No. 1, XP-004326801, pp. 105-111, "Region of Interest Coding in JPEG 2000", Jan. 2002.

* cited by examiner

FIG.3A

| T00 | T01 | T02 | T03 |
|---|---|---|---|
| T04 | T05 | T06 | T07 |
| T08 | T09 | T10 | T11 |
| T12 | T13 | T14 | T15 |

| T00 | T01 | T02 | T03 | T04 | T05 | T06 | T07 |
|---|---|---|---|---|---|---|---|
| T08 | T09 | T10 | T11 | T12 | T13 | T14 | T15 |
| T16 | T17 | T18 | T19 | T20 | T21 | T22 | T23 |
| T24 | T25 | T26 | T27 | T28 | T29 | T30 | T31 |
| T32 | T33 | T34 | T35 | T36 | T37 | T38 | T39 |
| T40 | T41 | T42 | T43 | T44 | T45 | T46 | T47 |
| T48 | T49 | T50 | T51 | T52 | T53 | T54 | T55 |
| T56 | T57 | T58 | T59 | T60 | T61 | T62 | T63 |

FIG.7

| MAIN HEADER | TILE 0 HEADER | BIT STREAM |
|---|---|---|
| | TILE 1 HEADER | BIT STREAM |
| | TILE 2 HEADER | BIT STREAM |
| | TILE 3 HEADER | BIT STREAM |

| | |
|---|---|
| TILE 9 HEADER | BIT STREAM |
| TILE 10 HEADER | BIT STREAM |
| TILE 11 HEADER | BIT STREAM |
| TILE 12 HEADER | BIT STREAM |

| | |
|---|---|
| TILE 18 HEADER | BIT STREAM |
| TILE 19 HEADER | BIT STREAM |
| TILE 20 HEADER | BIT STREAM |
| TILE 21 HEADER | BIT STREAM |

| | |
|---|---|
| TILE 27 HEADER | BIT STREAM |
| TILE 28 HEADER | BIT STREAM |
| TILE 29 HEADER | BIT STREAM |
| TILE 30 HEADER | BIT STREAM |

END OF CODESTREAM

FIG.8

|  |  |  |  |  |  |  |  |  |
|---|---|---|---|---|---|---|---|---|
| T00 | T01 | T02 | T03 | T04 | T05 | T06 | T07 | T08 |
| T09 | T10 | T11 | T12 | T13 | T14 | T15 | T16 | T17 |
| T18 | T19 | T20 | T21 | T22 | T23 | T24 | T25 | T26 |
| T27 | T28 | T29 | T30 | T31 | T32 | T33 | T34 | T35 |
| T36 | T37 | T38 | T39 | T40 | T41 | T42 | T43 | T44 |
| T45 | T46 | T47 | T48 | T49 | T50 | T51 | T52 | T53 |
| T54 | T55 | T56 | T57 | T58 | T59 | T60 | T61 | T62 |
| T63 | T64 | T65 | T66 | T67 | T68 | T69 | T70 | T71 |

FIG.11A

| T00 | T01 | T02 | T03 | T04 | T05 | T06 | T07 |
|---|---|---|---|---|---|---|---|
| T08 | T09 | T10 | T11 | T12 | T13 | T14 | T15 |
| T16 | T17 | T18 | T19 | T20 | T21 | T22 | T23 |
| T24 | T25 | T26 | T27 | T28 | T29 | T30 | T31 |
| T32 | T33 | T34 | T35 | T36 | T37 | T38 | T39 |
| T40 | T41 | T42 | T43 | T44 | T45 | T46 | T47 |
| T48 | T49 | T50 | T51 | T52 | T53 | T54 | T55 |
| T56 | T57 | T58 | T59 | T60 | T61 | T62 | T63 |

FIG.11B

| T00 | T01 | T02 | T03 |
|---|---|---|---|
| T04 | T05 | T06 | T07 |
| T08 | T09 | T10 | T11 |
| T12 | T13 | T14 | T15 |

FIG.12A

| T00 | T01 | T02 | T03 |
|-----|-----|-----|-----|
| T04 | T05 | T06 | T07 |
| T08 | T09 | T10 | T11 |
| T12 | T13 | T14 | T15 |

| T00 | T01 | T02 | T03 |
|-----|-----|-----|-----|
| T04 | T05 | T06 | T07 |
| T08 | T09 | T10 | T11 |
| T12 | T13 | T14 | T15 |

| T00 | T01 | T02 | T03 |
|-----|-----|-----|-----|
| T04 | T05 | T06 | T07 |
| T08 | T09 | T10 | T11 |
| T12 | T13 | T14 | T15 |

FIG.13B

| T00 | T01 | T02 | T03 |
|-----|-----|-----|-----|
| T04 | T05 | T06 | T07 |
| T08 | T09 | T10 | T11 |
| T12 | T13 | T14 | T15 |

IMAGE PROCESSING DEVICE, IMAGE FORMING APPARATUS, PROGRAM, AND STORING MEDIUM

BACKGROUND OF THE INVENTION

1. Field of the Invention

The present invention relates to an image processing device, an image forming apparatus, a program, and a storing medium.

2. Description of the Related Art

Japanese Patent Application Laid-Open No. 2001-197500 discloses a technique in which an image is encoded by the tile so that when a user desires to decode a part of an image by encoding, without decoding an entire region of the image, it is sufficient to decode only a tile that includes a region that is desired to be decoded.

Recently, newly developed scheme JPEG2000 has been gradually adopted as an international standard image compressing/expanding algorithm.

In a case where an image compressed and encoded by conventional JPEG was desired to be expanded in terms of only an image size with the contents of the image being maintained, all encoded data of the image had to be decoded and edited.

For this reason, it was difficult to perform such a process at a high speed by using a small memory capacity.

SUMMARY OF THE INVENTION

It is an object of the present invention to make it possible to perform image size change or image region moving on compressed and encoded image data at a high speed by using a small memory capacity.

According to one aspect of the present invention, there is provided an image processing device comprising:

setting means for setting image size change or image region moving for a code stream of an original image, wherein the original image is divided into a plurality of regions, and respective image data of the plurality of regions are compressed and encoded independently of each other to form the code stream; and position information changing means for changing position information of the plurality of regions so that the image size change or the image region moving can be performed on the code stream with all or a part of contents of the original image being maintained.

According to another aspect of the present invention, the position information changing means changes the position information of the plurality of regions to exclude, from the reduced image, a region that is among the plurality of regions and does not correspond to the part of the contents of the original image.

According to another aspect of the present invention, there is provided an image forming apparatus comprising:

a scanner that reads an original image; and an image processing device, wherein the image processing device comprises:

setting means for setting image size change or image region moving on a code stream of the original image, wherein the original image is divided into a plurality of regions, and respective image data of the plurality of regions are compressed and encoded independently of each other to form the code stream; and position information changing means for changing position information of the plurality of regions so that the image size change or the image region moving can be performed on the code stream to form a new code stream with all or a part of contents of the original image being maintained, and the image forming apparatus further comprises a printer engine that forms the original image or a changed image on paper, based on the code stream or the new code stream.

According to another aspect of the present invention, there is provided an image processing program comprising:

a program code of setting image size change or image region moving for a code stream of an original image, the code stream being constituted by a plurality of regions of the original image; and a program code of changing position information of the plurality of regions with all of or a part of contents of the original image being maintained to perform the image size change or the image region moving.

According to another aspect of the present invention, there is provided a storing medium that stores an image processing program comprising:

a program code of setting image size change or image region moving for a code stream of an original image, the code stream being constituted by a plurality of regions of the original image; and a program code of changing position information of the plurality of regions with all of or a part of contents of the original image being maintained to perform the image size change or the image region moving.

Other objects, features, and advantages of the present invention will become more apparent from the following detailed description when read in conjunction with the accompanying drawings.

BRIEF DESCRIPTION OF THE DRAWINGS

FIGS. 3A and 3B are illustrations of image size expansion;

FIG. 7 is an illustration of a case where an image size is expanded by deleting tiles having incomplete sizes;

FIG. 8 is an illustration of a case where an image size is expanded by excluding image information of tiles having incomplete sizes;

FIGS. 11A and 11B are illustrations of image size reduction;

FIGS. 12A and 12B are illustrations of changing a specific region of an image;

FIGS. 13A and 13B are illustrations of processing tiles having incomplete sizes when a specific region of an image is changed;

DETAILED DESCRIPTION OF THE PREFERED EMBODIMENTS

First Embodiment

A first embodiment of the present invention will be described.

Figure 1:
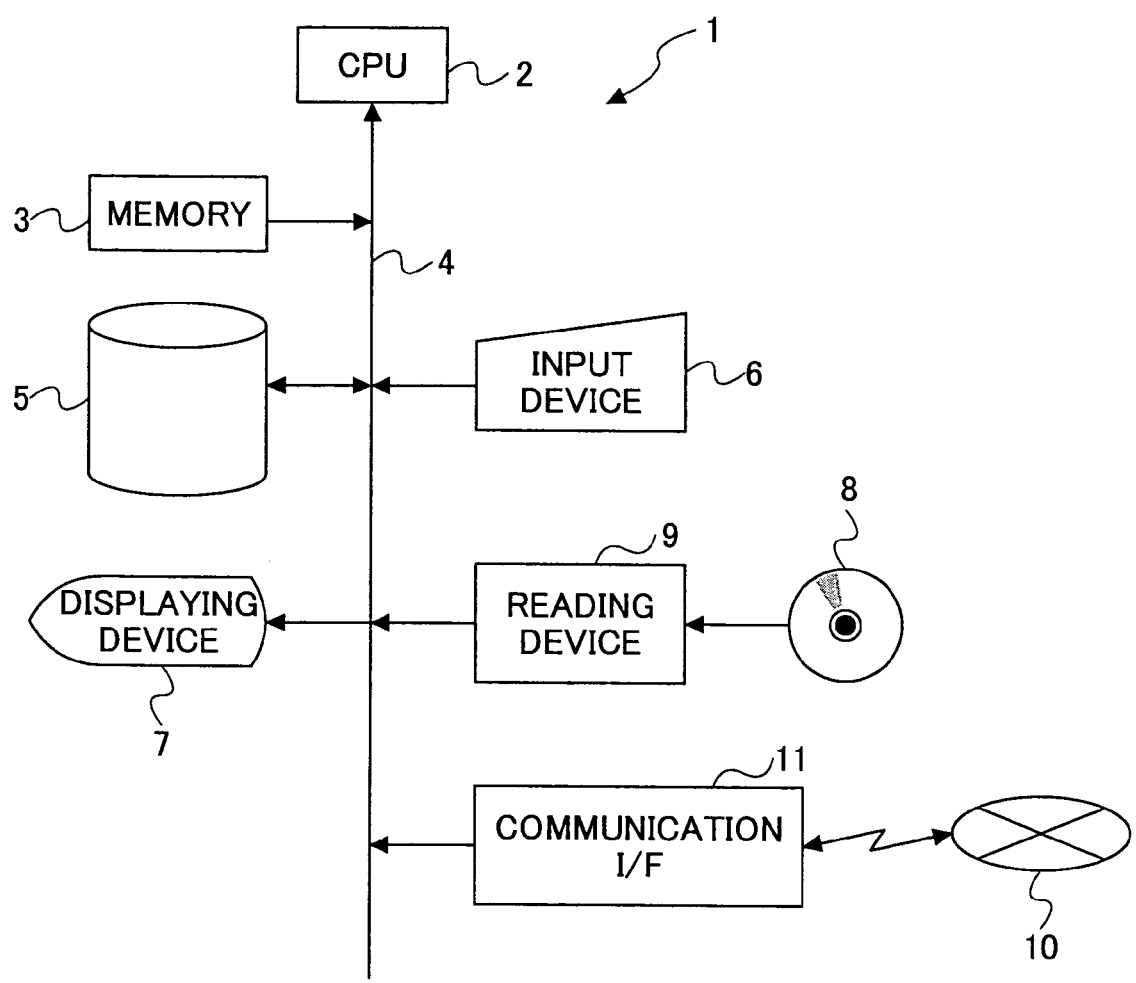
FIG. 1 is a block diagram showing an electrical connection in an image processing device according to a first embodiment of the present invention.

FIG. 1 is a block diagram showing an electrical connection in an image processing device 1 according to the first embodiment of the present invention. As shown in FIG. 1, the image processing device 1 may be a computer such as a personal computer that has a CPU 2 for performing various arithmetic operations and mainly controlling each unit of the image processing device 1, and a memory 3 constituted by various ROMs and RAMs. The CPU 2 and the memory 3 are connected by a bus 4.

Further connected to the bus 4 via a predetermined interface are a magnetic storage device 5 such as a hard disk, an input device 6 constituted by a mouse and a keyboard, a displaying device 7 such as a LCD or a CRT, a reading device 9 that reads information from a storing medium 8 such as an optical disc, and a predetermined communication interface 11 for performing communication with a network 10 such as the Internet. As the storing medium 8, various media, for example, an optical disc such as a CD or a DVD, a magnetic optical disc, a flexible disc may be used. As the reading device 9, an optical disc drive, a magnetic optical disc drive, or a flexible disc drive may be used in accordance with a type of the storing medium 8.

The magnetic storage device 5 stores an image processing program used for embodying the first embodiment of the present invention. This image processing program is read from the storing medium 8, or down-loaded from the network 10 such as the Internet so that the image processing program can be installed in the magnetic storage device 5. By installing the image processing program to the magnetic storage device 5, an operation of the image processing device 1 is enabled. This image processing program may function as a part of specific application software, or may function on a predetermined operating system.

Figure 2:
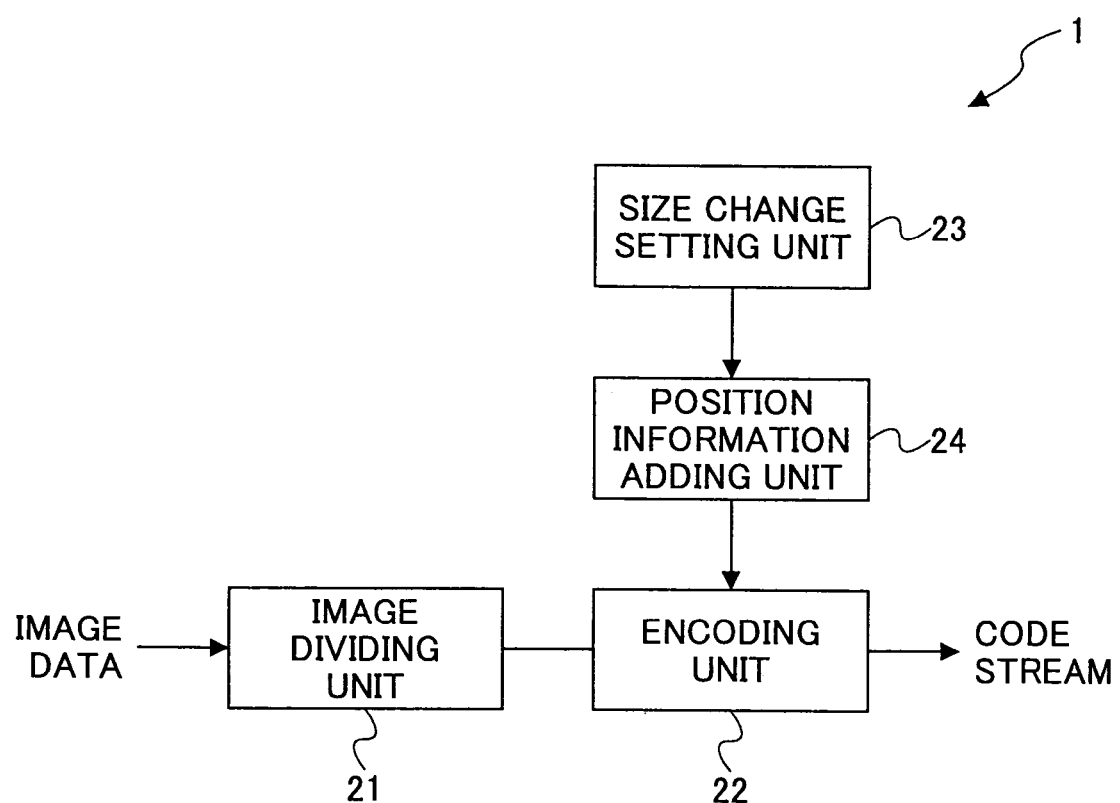
FIG. 2 is a functional block of the image processing device of the first embodiment.

FIG. 2 is a functional block of a process performed by the image forming apparatus 1. The image processing device 1 compresses and encodes image data by using a JPEG2000 algorithm. In accordance with the JPEG2000 algorithm, an image is divided into a plurality of small regions (tiles), and encoding is performed independently on each tile in a hierarchical fashion so that a code stream can be output from an encoding unit 22.

Specifically, an image dividing unit 21 divides image data into tiles, and outputs the divided image data to the encoding unit 22. The encoding unit 22 performs encoding process independently on each tile to compress and encode the image data so as to form the code stream. To perform this process, the encoding unit 22 may use a two-dimensional wavelet transformation and entropy-encoding (including arithmetic encoding). In this example, the encoding unit 22 uses the JPEG2000 algorithm. A size change setting unit 23 sets a change of an image size or a change of a region. In accordance with the setting made by the size change setting unit 23, a position information adding unit 24 adds position information or the like indicating a new position in the image to each tile of the code stream encoded by the encoding unit 22 so as to form a new code stream. An image of the newly formed code stream is an image whose size was changed from that of the original image, or an image in which an image region was moved from an original region position in the original image while all or a part of the contents of the original image are maintained.

Each function of the dividing unit 21, the encoding unit 22, the size change setting unit 23, and the position information adding unit 24 is realized by a process that the CPU 2 executes based on the image processing program. Specifically, an image size described in a header part and/or an index that is position information indicating a position of a tile is changed so as to add the position information. The position information is information of an encoded data position compared to the input code stream.

Next, the process performed by the configuration shown in FIG. 2 will be described.

(1) Expanding of an Image Size

FIG. 3A shows an image 31 that is divided into 16 tiles T00 through T15 by the image dividing unit 21. As shown in FIG. 3B, a margin part is added to the image of FIG. 3A so as to form a code stream of an image 32 having a four times larger size than that of the image 31 with a size of a region of the original image 31 being maintained. In this manner, by only changing header information of the tiles T00 through T15, and an index of the tiles, it is possible to form the code stream of the image 32 that is changed from the image 31 so as to have the double size of the image 31. In other words, in the case of image size expanding, additional image tiles (regions) may be added to an original image so that a displayed region, for example can be increased.

Figure 4:
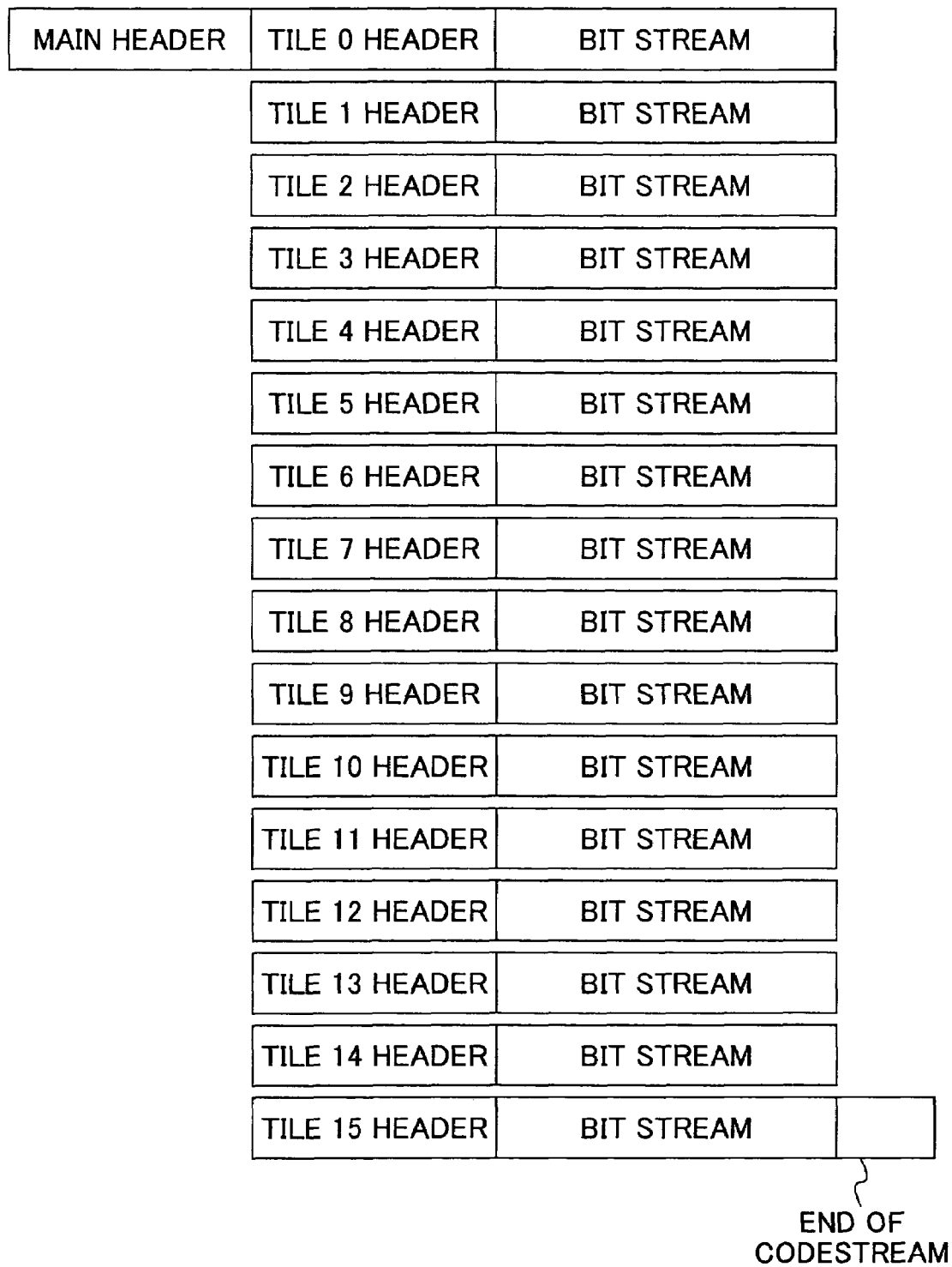
FIG. 4 shows a data configuration of a code stream before size expansion.
Figure 5:
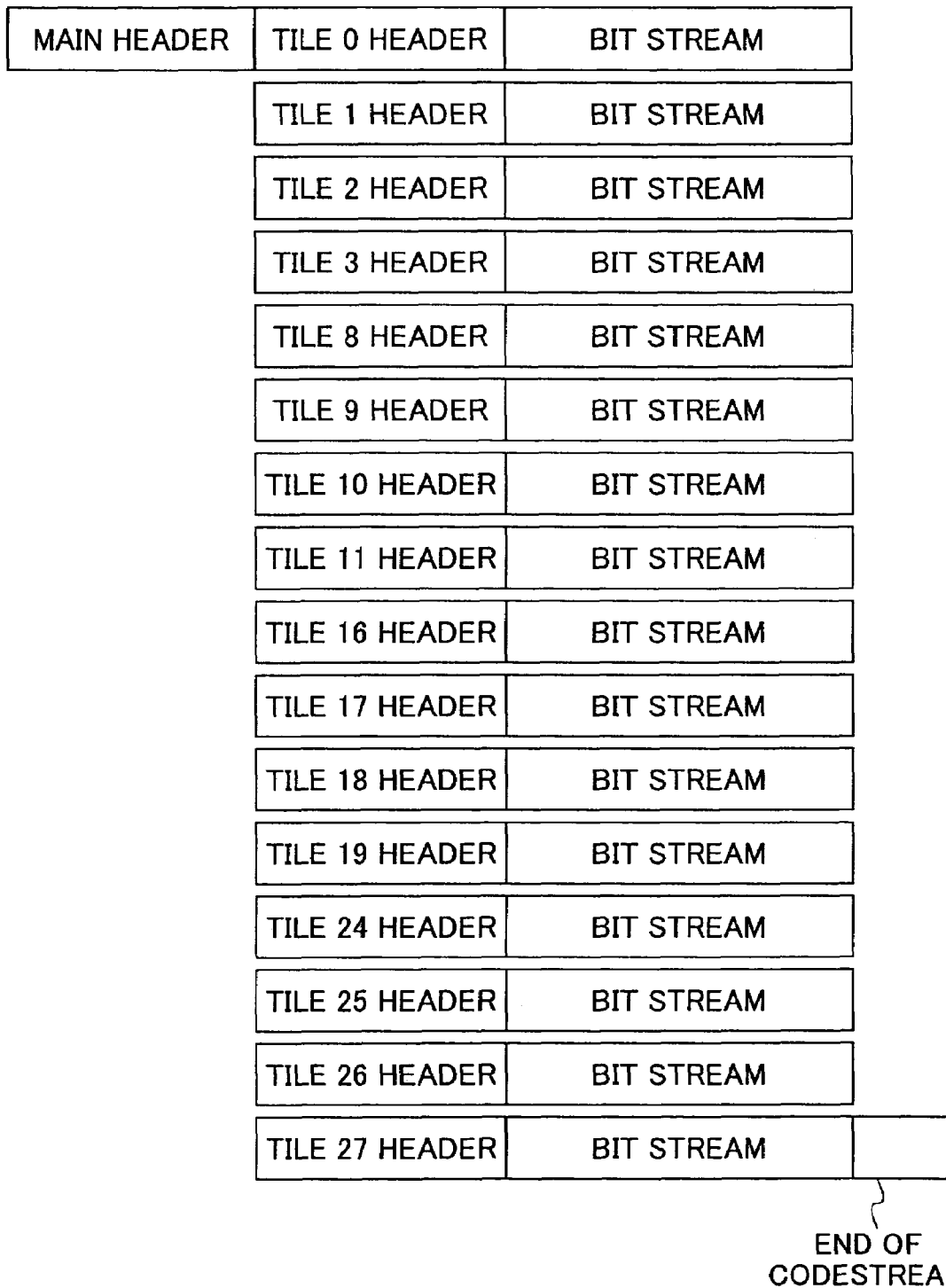
FIG. 5 shows a data configuration of a code stream after the size expansion.

FIG. 4 shows one example of a data configuration of a code stream of the original image 31. FIG. 5 shows a data configuration of the code stream of the image 32 whose size is changed from the size of image 31. For simplicity, in FIG. 5, data of the tiles T04, and so on of the image 32 are not shown in the code stream of FIG. 5, but the tiles T04, and so on may exist in the code stream of FIG. 5. As understood from comparison between FIGS. 4 and 5, the data configuration of FIG. 5 is formed such that data of the tile 4 is changed to data of a tile T8, data of the tile T5 is changed to data of a tile T9, data of the tile T6 is changed to data of a tile T10, data of the tile T7 is changed to data of a tile T11, data of the tile 8 is changed to data of a tile T16, data of the tile T9 is changed to data of a tile T17, data of the tile T10 is changed to data of a tile T18, data of the tile T11 is changed to data of a tile T19, data of the tile T12 is changed to data of a tile T24, data of the tile T13 is changed to data of a tile T25, data of the tile T14 is changed to data of a tile T26, and data of the tile T15 is changed to data of a tile T27. In this manner, the image 31 is changed to the image 32 having the four times larger size than that of the image 31. In the example shown in FIGS. 3A and 3B, the original region of the image 31 is positioned at the upper left side in the image 32.

Figure 6A:
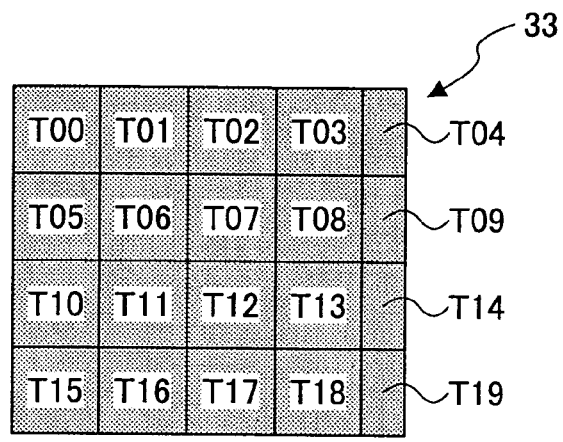
FIGS. 6A and 6B are an illustration of image size expansion when there are tiles having incomplete sizes.
Figure 6B:
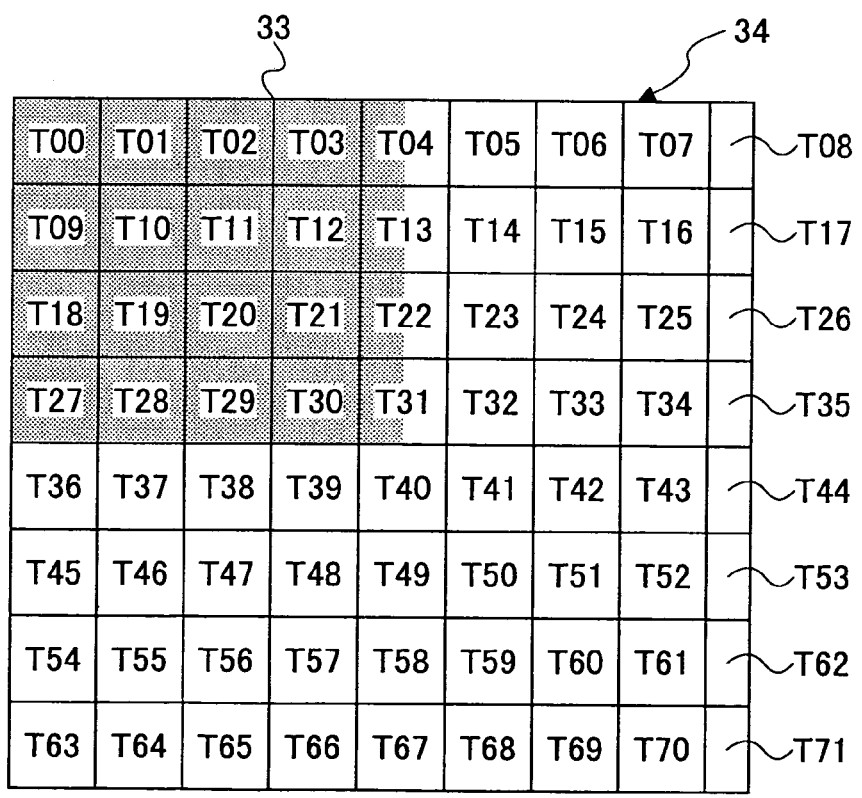

Next, another example will be described. Also in this example, an original image 33 shown in FIG. 6A is changed to an image 34 shown in FIG. 6B that has a size four times larger than that of the image 33. As in the example of FIG. 3 where the size of the original image 31 is an integral multiple of a tile size, by only changing an index of tiles, it is possible to form a code stream of an image that has a four times larger size than that of an original image. However, in an example of FIG. 6A, an image before changing includes tiles (T04, T09, T14, and T19) having an incomplete size smaller than a complete tile size described in header information, only changing an index of tiles results in an expanded image different from a desired image. In such a case, the encoding unit 22 specifies which tiles have incomplete seizes based on the header information, performs decoding on the tiles having incomplete sizes, edits the decoded image data, and create compressed and encoded data by using the JPEG2000 algorithm again. Thereby, from the tiles having incomplete sizes, it is possible to create tiles (T04, T13, T22, and T31 in FIG. 6B) having complete sizes such that a part of each created tile includes image information of each original tile having the incomplete size. Furthermore, in a case where expanding of the image accompanies tiles having incomplete sizes (T08, T17, T26, T35, T44, T53, T62, and T71) in the expanded image 34, these tiles are also created. However, these tiles having incomplete sizes need to have header information describing these incomplete tile sizes, and may have or do not need to have image information.

Alternatively, the following process may be performed. The encoding unit 22 may delete encoded data of the tiles having incomplete sizes T04, T09, T14, and T19 at a boundary part to create a code stream as shown in FIG. 7. In the changed code stream shown in FIG. 7, data of a tile T5 is changed to data of a tile T9, data of a tile T6 is changed to data of a tile T10, data of a tile T7 is changed to data of a tile T11, data of a tile T8 is changed to data of a tile T12, data of a tile T10 is changed to data of a tile T18, data of a tile T11 is changed to data of a tile T19, data of a tile T12 is changed to data of a tile T20, data of a tile T13 is changed to data of a tile T21, data of a tile T15 is changed to data of a tile T27, data of a tile T16 is changed to data of a tile T28, data of a tile T17 is changed to data of a tile T29, and data of a tile T18 is changed to data of a tile T30. Encoded data of the original tiles T4, T9, T14, and T19 is discarded so that the original image at a part corresponding to the tiles T04, T13, T22, and T31 cannot be displayed.

Figure 9:
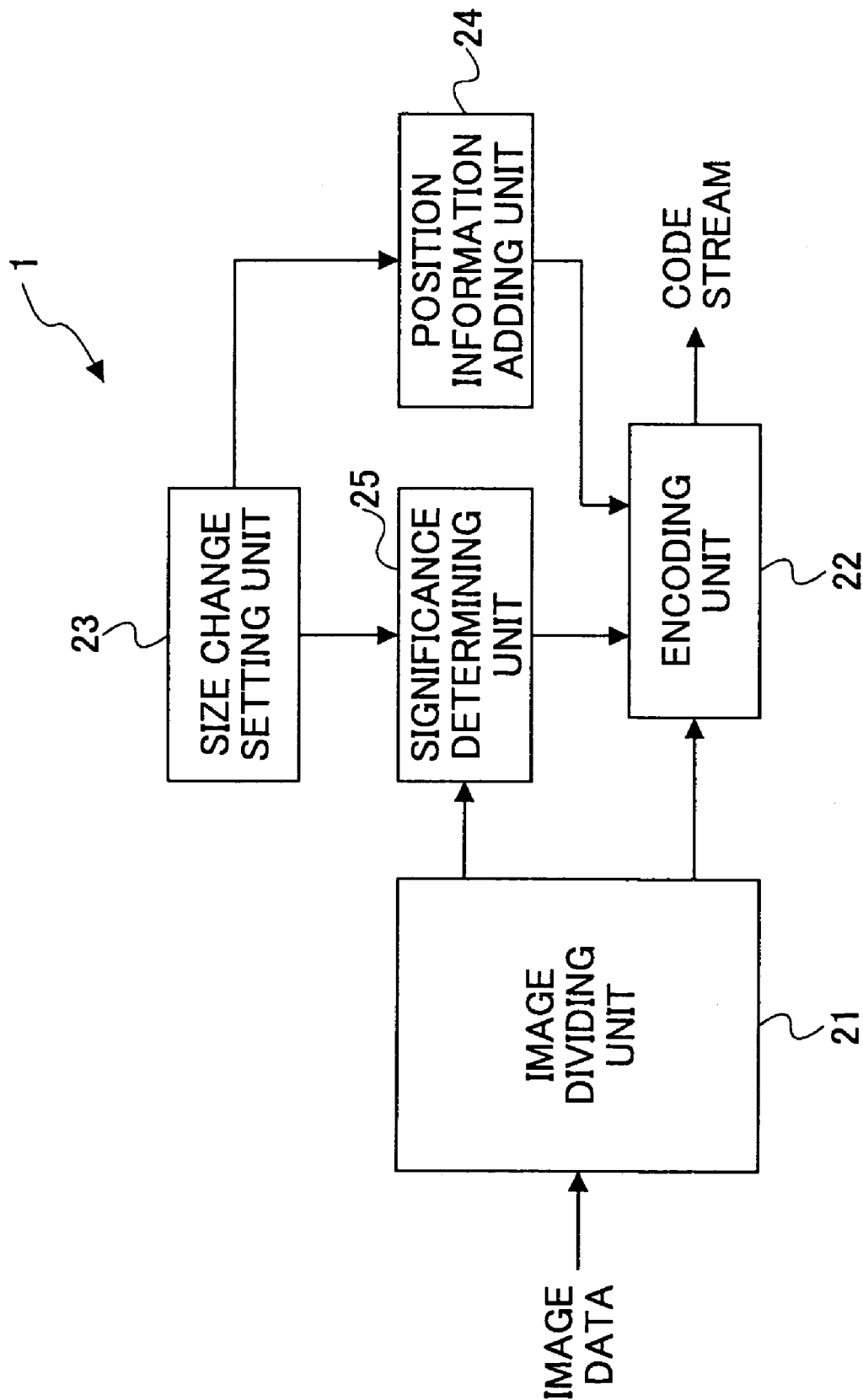
FIG. 9 is a functional block of the image processing device that includes a significance determining unit.

In addition, as shown in FIG. 9, a significance determining unit 25 may be added to the configuration of FIG. 2. The significance determining unit 25 determines whether or not a tile having an incomplete size includes significant image data. Specifically, the significance determining unit 25 determines whether or not the tile having an incomplete size only includes image data of a ground color of original document paper (original illustration paper or the like), and/or determines whether or not the tile having an incomplete size includes significant image data. When it is determined that the tile having an incomplete size includes significant image data, as in the example of FIG. 6B, the encoding unit 22 encodes (or re-encodes) the tiles having incomplete sizes such that image information of these tiles is maintained to perform size expanding. On the other hand, when it is determined that the tile having an incomplete size does not include significant image data, the encoding unit 22 performs encoding with the tile having an incomplete size being deleted as in the example shown in FIGS. 7 and 8.

When performing size changing, various pixel values may be assigned to a region that does not include the substantive contents of the tile having an incomplete size on the assumption that this tile has a complete size. However, a white color of the lowest pixel value (in a case of 8-bit image, 0 out of 0 through 255) is generally assigned to this region to perform encoding. A pixel value of a ground color of an original document may be assigned to this region. A ground color extracting unit 26 (refer to FIG. 10) (that is described later) detects a pixel value of a tile corresponding to a ground color part of the original document, and assigns this detected pixel value to the region of the tile corresponding to the ground color.

The significance determining unit 25 may compare object code data amount of a tile with a predetermined threshold value, and determine that the tile does not include significant image data when the object code amount of the tile is smaller than the predetermined threshold value, and determines that the tile includes significant image data when the object code amount is larger than the predetermined threshold value.

Further, this determination by the significance determining unit 25 may be performed by using at least one of image information and code information in an input code stream.

Moreover, the determination by the significance determining unit 25 may be performed by using particular sub-band data of wavelet coefficients for the object tile.

In each of the above-described examples, in the code stream of the expanded image size, code data does not exist in the tile that does not include the original image data. Accordingly, the code amount of the expanded image is not so different from the code amount of the original image, so that the data amount can be made small.

However, code data may be provided for such a blank tile that does not include the original image data in accordance with a necessity. In this case, various pixel values may be provided for the blank tile, but generally, a white color of the lowest pixel value (in a case of a 8-bit image data, 0 out of 0 through 255) may be provided for the blank tile to perform encoding. Alternatively, a pixel value of a ground color of the original document may be provided for the blank tile.

Figure 10:
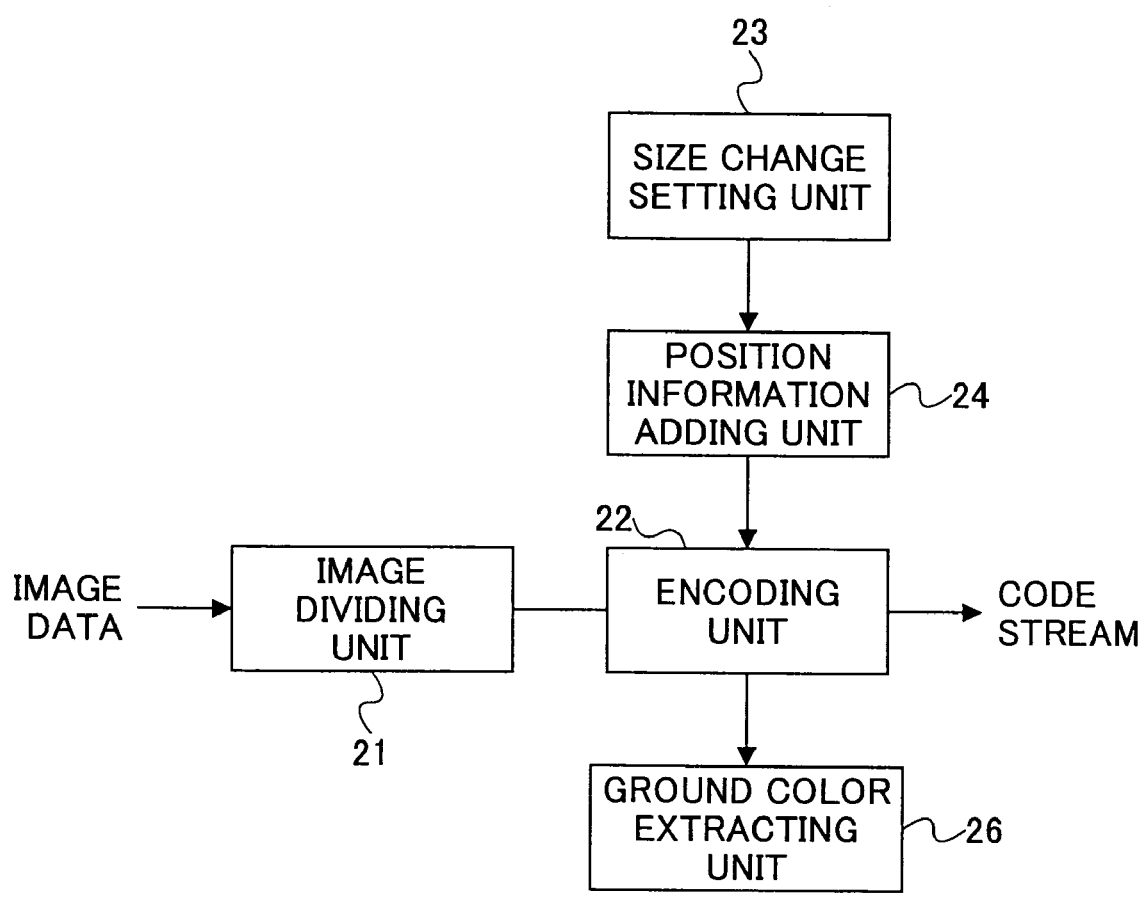
FIG. 10 is a functional block of the image processing device that includes a ground color determining unit.

In order to obtain the pixel value of the ground color of the original document, as shown in FIG. 10, a ground color code extracting unit 26 is provided to the configuration of FIG. 2. Thereby, the code data of the tile having an incomplete size is decoded, and the number of pixels with respect to each pixel value of this tile is counted, and the most counted pixel value is determined to be the pixel value of the ground color of the original document. Thereafter, image data in which the pixel value of the ground color of the original document is provided to pixels for the tile having an incomplete size may be encoded again. Alternatively, the encoding unit 22 provides, to pixels for the tile having an incomplete size, a pixel value that is previously prepared as a pixel value of the ground color of the original document.

(2) Reduction of an Image Size

Next, reduction of an image size by the configuration of FIG. 2 will be described with reference to FIGS. 11A and 11B. In the case of the image size reduction, a part of contents of an original image can be excluded from the original image so that a displayed region, for example, of the original image can be decreased. When reducing an image size, as shown in FIGS. 11A and 11B, a reduced image 36 can be created from an original image 35 by rewriting position information of tiles such that original tiles T18 through T21 are changed to tiles T00 through T03, respectively, original tiles T26 through T29 are changed to tiles T04 through T07, respectively, original tiles T34 through T37 are changed to tiles T08 through T11, and original tiles T42 through T45 are changed to tiles T12 through T15.

In this case, the encoding unit 22 may delete from a new code stream original tiles other than the tiles T18 through T21, T26 through T29, T34 through T37, and T42 through T45 of the original image 35.

Alternatively, these original tiles other than the tiles T18 through T21, T26 through T29, T34 through T37, and T42 through T45 of the original image 35 may remain in a new code stream, and the position information adding unit 24 may add, to the new code stream of the new image 36, position information indication that these tiles are out of a range of the image 36. In this manner, by maintaining the information indicating that unnecessary tiles are out of the necessary range, it is also possible to create the original image 35 from the code stream of the new image 36.

(3) Changing of an Image Region

With the configuration of FIG. 2, by only changing header information, and an index for position information of tiles, it is possible to move a region having a certain size in an image to another region, and to create code data for the image in which the region has been moved.

FIGS. 12A and 12B show this case. An upper left region 38 of an original image 37 (refer to FIG. 12A) is moved to a lower right position of an image 39 shown in FIG. 12B. Tiles other than tiles of the region 38 do not have to include code data, or may include code data for a predetermined pixel value as in the above-described (1).

Code data for the moved region is created such that data of an original tile T00 is changed to data of a tile T10, data of an original tile T01 is changed to data of a tile T11, data of an original tile T04 is changed to data of a tile T14, and data of an original tile T05 is changed to data of a tile T15. In a case where after the region 38 is moved, code data is prepared for tiles T00, T01, T04, and T05, for example, code data corresponding to a ground color of an original document may be provided for these tiles T00, T01, T04, and T05. In this case, as in the above-described (1), the ground color code extracting unit 26 may extract a pixel value of the ground color of the original document, or a predetermined pixel value that is previously prepared may be set as the pixel value of the ground color. Further alternatively, the data of the tiles T10, T11, T14, and T15 of the original image 37 may be set for the tiles T00, T01, T04, and T05 of the changed image 39. Further alternatively, the image region 38 of the original image may be moved with all of data of the tiles T00 through T15 of the original image 37 being maintained such that the data of the tiles T00, T01, T04, and T05 of the original image are used as data of the tiles T00, T01, T04, and T05 of the changed image 39.

As in the example of FIGS. 12A and 12B, in a case where when moving the region 38 having a certain size to another region, the region 38 at the original position in the image 37 has a size that is an integral multiple of a tile size, by only changing an index of tiles, it is possible to create a code stream for the moved region 38. However, as in an example of FIG. 13A, a part of a region 38 to be moved has an incomplete size smaller than a complete size of a tile, simply changing an index of tiles results in an image different from a desired image.

For this reason, as in the above-described (1), the encoding unit 22 decodes such tiles having incomplete tile sizes, edits image data of these tiles, and encodes the edited image data again so as to create encoded data for a moved region of FIG. 13B.

Alternatively, the encoding unit 22 may delete such tiles having incomplete sizes. In this case, it may be considered that an original tile in the original image data that has an incomplete size does not exist at an original position in the original image. In another example for a tile having an incomplete size, code data for the original tile having an incomplete size may be used in an image after the region is moved, or code data corresponding to a ground color of an original document may be used in the image after the region is moved.

Furthermore, as in the above-described (1), the significance determining unit 25 may determine whether or not a tile having an incomplete size includes significant image data. When the tile includes significant image data, the encoding unit 25 may decode the tile having an incomplete size, edits image data of the decoded tile, and compresses the edited image data to create code data of this tile. Meanwhile, when this tile having an incomplete size does not include significant image data, the encoding unit 25 may delete this tile as in the above-described (1).

The above-described image processing device according to the first embodiment of the present invention can be used in various fields. For example, in a publishing industry, a layout of an image can be modified by expanding the image, moving a region in the image, and the like. In a specific example, based on image data obtained by reading an image of an original document (or illustration and the like) by using a scanner, size reduction is performed by deleting an edge part of the original image so that an image part for punch holes existing at the edge part of the original image can be deleted from the code data. In addition, an image processed by the image processing device 1 is not limited to a still image, but may be a moving image. When the image processing device 1 processes a moving image, a Motion-JPEG2000 algorithm is applied to the moving image. By performing reduction process on a moving image such that a remaining image is limited to a center part of the moving image, even a computer that has a low processing ability can reproduce the moving image without exposing the computer to an excess load.

Additionally, in each case of the above-described image size expanding (1), the image size reducing (2), and the image region moving (3), if there is a tile (called a blank tile) that does not include the contents of the original image, the image processing device may include a code data generating unit (not shown) that generates code data for the blank tile, and adds the generated code data to the code stream of the original image so that the image size expanding, the image size reducing, or the image region moving can be performed by using the code data for the blank tile.

Second Embodiment

Next, a second embodiment of the present invention will be described.

Figure 14:
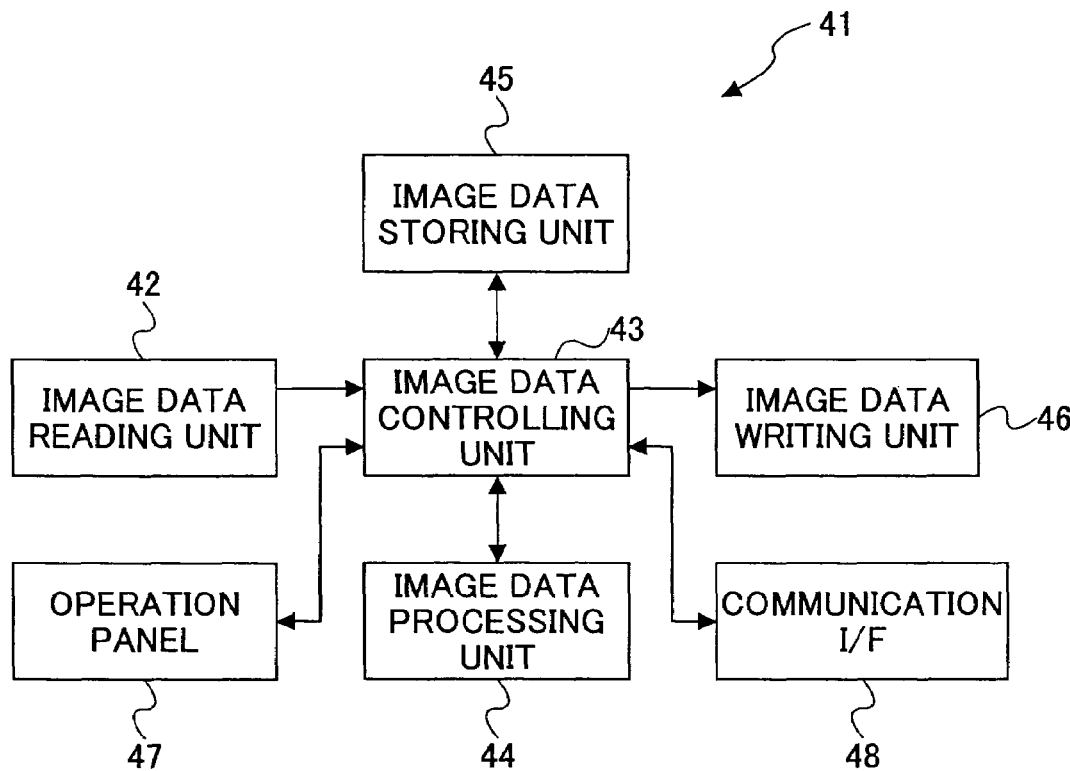
FIG. 14 is a block diagram showing an entire configuration of an image processing device according to a second embodiment of the present invention.

FIG. 14 is a block diagram showing an outline configuration of a digital copier 41 according to the second embodiment of the present invention. The digital copier 41 is an embodied example of an image forming apparatus according to the present invention. The digital copier 41 includes an image data reading unit 42 that functions as a scanner, an image data controlling unit 43, an image data processing unit 44 that is an embodied example of the image processing device according to the present invention, an image data storing unit 45, an image data writing unit 46 that has a printer engine, an operation panel 47, and a communication interface 48.

The image data reading unit 46 performs a process of reading light reflected by an original document by using an optical system, performs a process of converting a light signal into an electric signal by using a CCD (Charge Coupled Device), and performs a process of converting an analog signal into a digital signal by using an A/D converter.

The image data controlling unit 43 mainly controls each of these units. The image data controlling unit 43 has an interface with each of these units (e.g., one-to-one correspondence individual interface, or an interface via a common bus), and transfers image data between these units.

The image processing unit 44 performs various processes on image data input to or output from the image processing unit 44 in accordance with control of the image data controlling unit 43.

The image data storing unit 45 stores or reads image data input to or output from the image data storing unit 45 in accordance with control of the image data controlling unit 43.

The image data writing unit 46 forms an image based on image data input to the image data writing unit 46 in accordance with control of the image data controlling unit 43. The image data writing unit 46 may use as a printing method an electrophotographic method, an inkjet method, a sublimation thermal transfer method, a silver-photographic method, a direct thermal recording method, and a melting thermal transfer method.

The operation panel 47 includes various keys for receiving various operations from a user, and a liquid crystal display that displays various images and messages.

The communication interface 48 performs transmission or reception of image data with an exterior personal computer by connecting the digital copier 41 with the exterior personal computer.

The image processing unit 44 performs various processes on image data received from the image reading unit 42 or the communication interface 48. Particularly, by using the JPEG2000 algorithm, the image processing unit 44 compresses and encodes image data, changes an image size, and/or moves a region.

Figure 15:
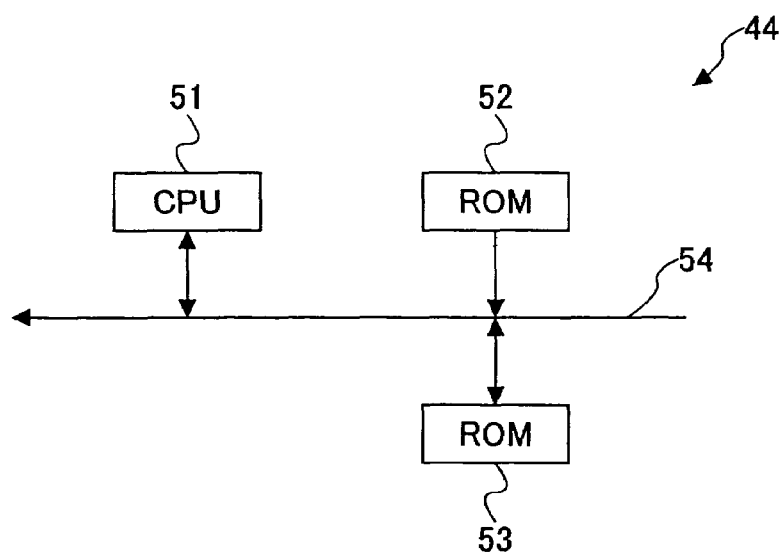
FIG. 15 is a block diagram showing an electrical connection in an image data processing unit of the image processing device of FIG. 14.

FIG. 15 is a block diagram showing a hardware configuration in the image data processing unit 44. The hardware configuration is provided for compressing and encoding image data, changing an image size, and/or moving a region. As shown in FIG. 15, a CPU 51, a ROM 52, and a RAM 53 are connected to each other by a bus 54. The ROM 52 is provided for storing the image processing program, and the CPU 51 uses the RAM 53 as a working area based on the image processing program to realize the functional blocks shown in FIGS. 9 and 10 so as to perform various processes such as the image size expanding and reducing, and moving of a region as described in the first embodiment of the present invention.

The image data processing unit 44 may performs these processes directly on image data received from the image data reading unit 42 or the communication unit 48. Alternatively, the image data processing unit 42 may compress and encode image data received from the image data reading unit 42 or the communication interface 48 by using the JPEG2000 algorithm to form a code stream, then store the formed code stream in the image data storing unit 5, and read the stored code stream to perform various processes on the code stream in accordance with a necessity.

Figure 16:
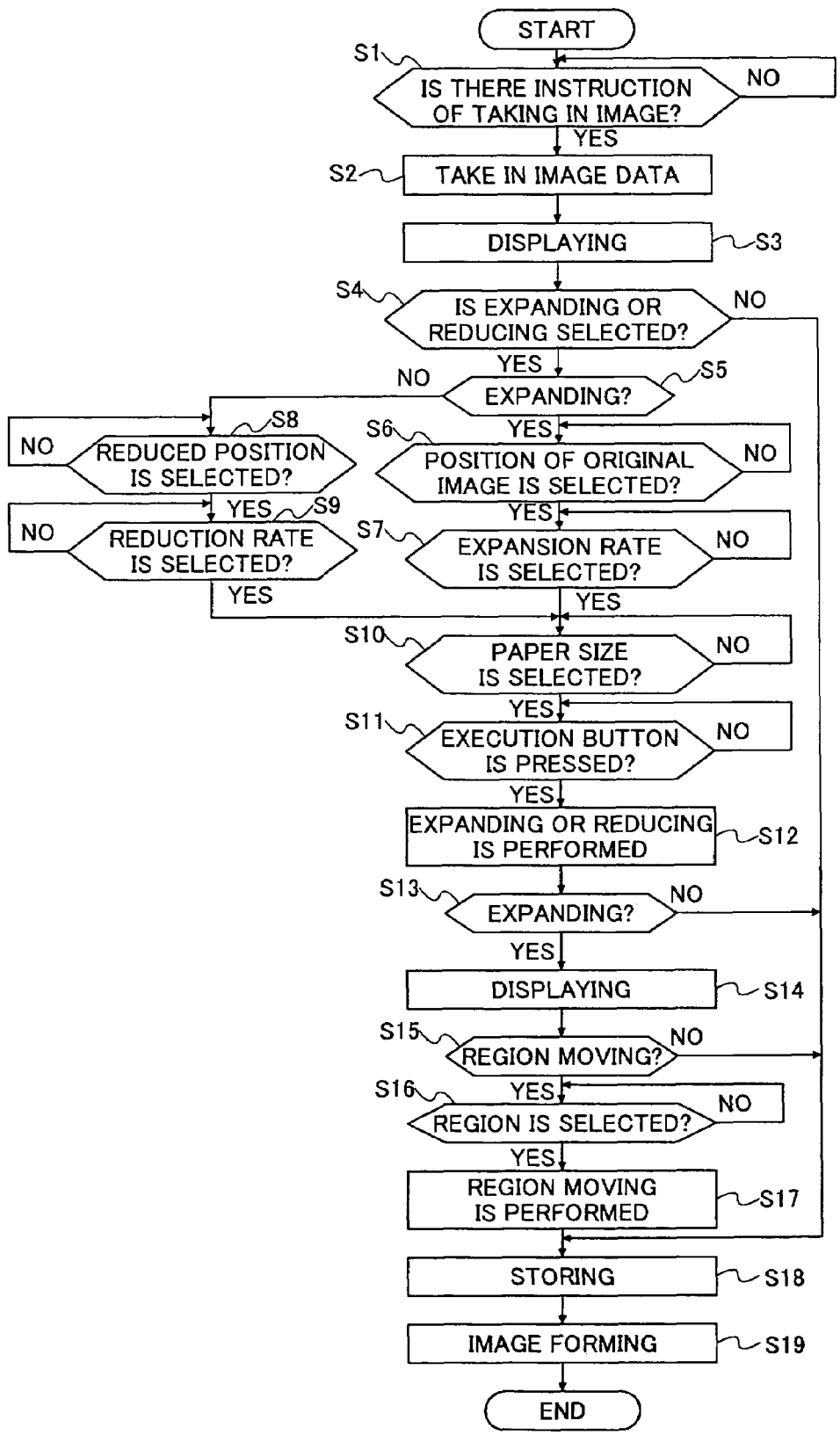
FIG. 16 is a flowchart of a process performed by the image processing device of FIG. 14

FIG. 16 is a flowchart showing a process performed by a CPU of the image data controlling unit 43. First, when a user operates the operation panel 47 to provide an instruction of taking in image data (Yes at Step S1), the image data reading unit 42 or the communication interface 48 takes in image data at Step S2, and an image of the taken-in image data is displayed on the liquid crystal display of the operation panel 47 at Step S3.

The user can view the displayed image, and select expanding or reducing of a size of the image at Step S4. When the user selects the expanding of the image size (Yes at Step S5), the user selects, from an upper right position, an upper left position, a lower right position, a lower left position, a center position, and the like, a position at which the original image should be located in the expanded image (Yes at Step S6), and selects an expanding rate such as a 1.5-fold or 2-fold expansion rate at Step S7. When the user selects the reducing of the image size (No at Step S5), the user selects, from an upper right position, an upper left position, a lower right position, a lower left position, a center position, and the like, a position (or a range) to which the image should be reduced from the original image (Yes at Step S8), and selects a reducing rate such as a 0.75-fold or 0.5-fold reduction rate (Yes at Step S9).

Subsequently, the user selects a paper size (e.g., a B5 or A4 size)(Yes at Step S10), and presses down a predetermined execution button of the operation panel 7 (Yes at Step S11) so that the image data taken in at Step S2 can be compressed and encoded by the JPEG2000 algorithm to form a code stream. A process of the selected expanding or reducing is performed on this code stream at Step S12. The expanding or reducing process for the code stream is performed in the manner described in detail in the first embodiment of the present invention. When the image expanding process was performed (Yes at Step S13), a process of moving a region of the image can be performed on a code stream newly created by the expanding process. Specifically, the image created by the expanding process is displayed on the liquid crystal display of the operation panel 47 at Step S14, and the user can view the displayed image. Thereafter, when the user uses the operation panel 47 to further select the process of moving a region in the expanded image (Yes at Step S15), the user select a moving object region to be moved from an upper right region, an upper left region, a lower right region, and a lower left region, a center region, and the like of the expanded image, and selects a region to which the selected moving object region is moved, from the upper right region, the upper left region, the lower right region, the lower left region, the center region, and the like of the expanded image at Step S16. The region moving process is thereby performed at Step S17. In accordance with selections by the user at Steps S6 through S9, and S16, the size change setting unit 23 performs setting for the image size change and/or the image region moving.

The code stream created by the expanding or reducing process, and the image region moving process is stored in the image data storing unit 45 at Step S18. Meanwhile, when the user does not select the expanding or reducing of the image size (No at Step S4), the image data is compressed and encoded by the JPEG2000 algorithm without performing the expanding or reducing process to form a code stream, and the formed code stream is stored in the image data storing unit 45. The code stream formed in each case is sent to the image data writing unit 46 where the image of the code stream is formed on paper of the selected size at Step S19.

This patent application is based on Japanese priority patent application No. 2002-271186 filed on Sep. 18, 2002, the entire contents of which are hereby incorporated by reference.

What is claimed is:

1. An image processing apparatus for generating a second code stream from a first code stream formed from dividing an image into tiles and performing compression coding for each tile, the image processing apparatus comprising:

a setting unit configured to set an image size change or a move of relative position in the image for at least one tile;

a position information changing unit configured to generate the second code stream by adding position information indicating a new position in the image for the tile or tiles of the first code stream for which the setting unit set the image size change or the move of relative position in the image.

2. The image processing apparatus as claimed in claim 1, wherein the position information changing unit changes an image size in a header part of the first code stream.

3. The image processing apparatus as claimed in claim 1, wherein the position information changing unit changes an index that is position information indicating a position of a tile of the first code stream.

4. The image processing apparatus as claimed in claim 1, further comprising:
   a significance determining unit configured to determine whether a tile of an incomplete size includes significant image data,
   wherein the image processing apparatus performs compression coding again on the tile of the incomplete size according to a determination result of the significance determining unit.

5. The image processing apparatus as claimed in claim 4, wherein, when the tile of the incomplete size includes significant image data, the image processing apparatus decodes the tile of the incomplete size and performs compression coding again on an image of a tile having a complete size, and
   when the tile of the incomplete size does not include significant image data, the image processing apparatus deletes the tile of the incomplete size.

6. An image processing method for generating a second code stream from a first code stream formed from dividing an image into tiles and performing compression coding for each tile, the image processing method comprising:
   setting an image size change or a move of relative position in the image for at least one tile;
   generating the second code stream by adding position information indicating a new position in the image for the tile or tiles of the first code stream for which the image size change or the move of relative position in the image is set.

7. The image processing method as claimed in claim 6 including changing an image size in a header part of the first code stream.

8. The image processing method as claimed in claim 6 including changing an index that is position information indicating a position of a tile of the first code stream.

9. The image processing method as claimed in claim 6, further comprising:
   determining whether a tile of an incomplete size includes significant image data,
   wherein the image processing method includes compression coding again on the tile of the incomplete size according to a determination result of the significance determining unit.

10. The image processing method as claimed in claim 9, wherein, when the tile of the incomplete size includes significant image data, the image processing method includes decoding of the tile of the incomplete size and compression coding again on an image of a tile having a complete size, and
    when the tile of the incomplete size does not include significant image data, the image processing method includes deletion of the tile of the incomplete size.

11. A computer-readable medium including computer executable instructions, wherein the instructions, when executed by a processor, cause the processor to perform a method for generating a second code stream from a first code stream formed from dividing an image into tiles and performing compression coding for each tile, the method comprising:
    setting an image size change or a move of relative position in the image for at least one tile;
    generating the second code stream by adding position information indicating a new position in the image for the tile or tiles of the first code stream for which the image size change or the move of relative position in the image is set.

12. The computer-readable medium as claimed in claim 11, wherein the method includes changing an image size in a header part of the first code stream.

13. The computer-readable medium as claimed in claim 11, wherein the method includes changing an index that is position information indicating a position of a tile of the first code stream.

14. The computer-readable medium as claimed in claim 11, wherein the method further comprises:
    determining whether a tile of an incomplete size includes significant image data,
    wherein the image processing method includes compression coding again on the tile of the incomplete size according to a determination result of the significance determining unit.

15. The computer-readable medium as claimed in claim 14, wherein, when the tile of the incomplete size includes significant image data, the method includes decoding of the tile of the incomplete size and compression coding again on an image of a tile having a complete size, and
    when the tile of the incomplete size does not include significant image data, the method includes deletion of the tile of the incomplete size.

* * * * *